(12) United States Patent
Chien et al.

(10) Patent No.: US 12,423,995 B2
(45) Date of Patent: Sep. 23, 2025

(54) LANE LINE RECOGNITION METHOD, ELECTRONIC DEVICE AND STORAGE MEDIUM

(71) Applicant: HON HAI PRECISION INDUSTRY CO., LTD., New Taipei (TW)

(72) Inventors: Yu-Hsuan Chien, New Taipei (TW); Chin-Pin Kuo, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 344 days.

(21) Appl. No.: 18/125,676

(22) Filed: Mar. 23, 2023

(65) Prior Publication Data
US 2024/0203133 A1   Jun. 20, 2024

(30) Foreign Application Priority Data
Dec. 20, 2022 (CN) .......................... 202211642796.1

(51) Int. Cl.
*G06K 9/00* (2022.01)
*G06T 5/80* (2024.01)
*G06V 20/56* (2022.01)

(52) U.S. Cl.
CPC .............. *G06V 20/588* (2022.01); *G06T 5/80* (2024.01)

(58) Field of Classification Search
CPC .................................. G06T 5/80; G06V 20/588
See application file for complete search history.

(56) References Cited

U.S. PATENT DOCUMENTS

| | | | |
|---|---|---|---|
| 2017/0301111 A1* | 10/2017 | Zhao | H04N 23/90 |
| 2019/0087661 A1* | 3/2019 | Lee | G06V 10/82 |
| 2020/0057889 A1* | 2/2020 | Lee | G06Q 50/00 |
| 2020/0225673 A1* | 7/2020 | Ebrahimi Afrouzi | A47L 11/4011 |
| 2020/0284883 A1* | 9/2020 | Ferreira | G01S 7/4815 |
| 2021/0131821 A1* | 5/2021 | Wang | G01C 21/3889 |
| 2021/0132612 A1* | 5/2021 | Wang | G01S 17/89 |
| 2021/0158546 A1* | 5/2021 | He | G01S 17/89 |
| 2021/0158547 A1* | 5/2021 | He | G01S 17/89 |
| 2021/0183093 A1* | 6/2021 | Park | G06V 20/588 |
| 2021/0197720 A1* | 7/2021 | Houston | G06N 3/045 |

FOREIGN PATENT DOCUMENTS

| | | | |
|---|---|---|---|
| CN | 109359602 | 2/2019 | |
| CN | 111126306 | * 12/2019 | ............... G06K 9/00 |

* cited by examiner

*Primary Examiner* — Hadi Akhavannik
(74) *Attorney, Agent, or Firm* — ScienBiziP, P.C.

(57) ABSTRACT

A lane line recognition method applied to an electronic device is provided. In the method, the electronic device converts a first foreground image into a bird's-eye view (BEV) image and determines the initial positions of the left lane line and the right lane line of the BEV image and fits a first curve and a second curve after a first sliding window slid each time and fits a third curve and a fourth curve after a second sliding window slid each time. The electronic device recognizes the left lane line according to the second curve and the right lane line according to the fourth curve. The method improves accuracy for recognizing lane lines of a road when a vehicle is moving on the road.

17 Claims, 4 Drawing Sheets

LANE LINE RECOGNITION METHOD, ELECTRONIC DEVICE AND STORAGE MEDIUM

FIELD

The present disclosure relates to an artificial intelligence technology, in particular to a lane line recognition method, an electronic device, and a storage medium.

BACKGROUND

Lane line detection is an important technology in driverless or assisted driving scenarios. Lane line detection refers to detections of traffic indication lines (e.g., lane lines) on the roads. At present, a method based on row classification is usually used to detect lane lines. The method based on row classification has fast detection speed and real-time performance. However, the method based on row classification is prone to overfitting due to a similarity of structures of the lane lines, resulting in low detection accuracy.

DETAILED DESCRIPTION

To more clearly understand the present application, some definitions of selected terms employed in the embodiments of is given. The definitions include various examples and/or forms of components that fall within the scope of a term and that may be used for implementation. The examples are not intended to be limiting. Furthermore, the components discussed herein, may be combined, omitted, or organized with other components or into different architectures.

It should be noted that, in the present application, "at least one" refers to one or more, and "a plurality of" refers to two or more than two. "And/or" refers to an association relationship between associated objects, representing that three relationships may exist. For example, A and/or B may include a case where A exists separately, A and B exist simultaneously, and B exists separately, where A and B may be singular or plural. The terms "first", "second", "third", "fourth", etc. in the description and claims and drawings of the present application are used for distinguishing similar objects, rather than for describing a specific sequence or order.

To more clearly understand a lane line recognition method and related device that provided by the embodiments of the present application. The following description describes an application scenario of the lane line recognition method.

Figure 1:
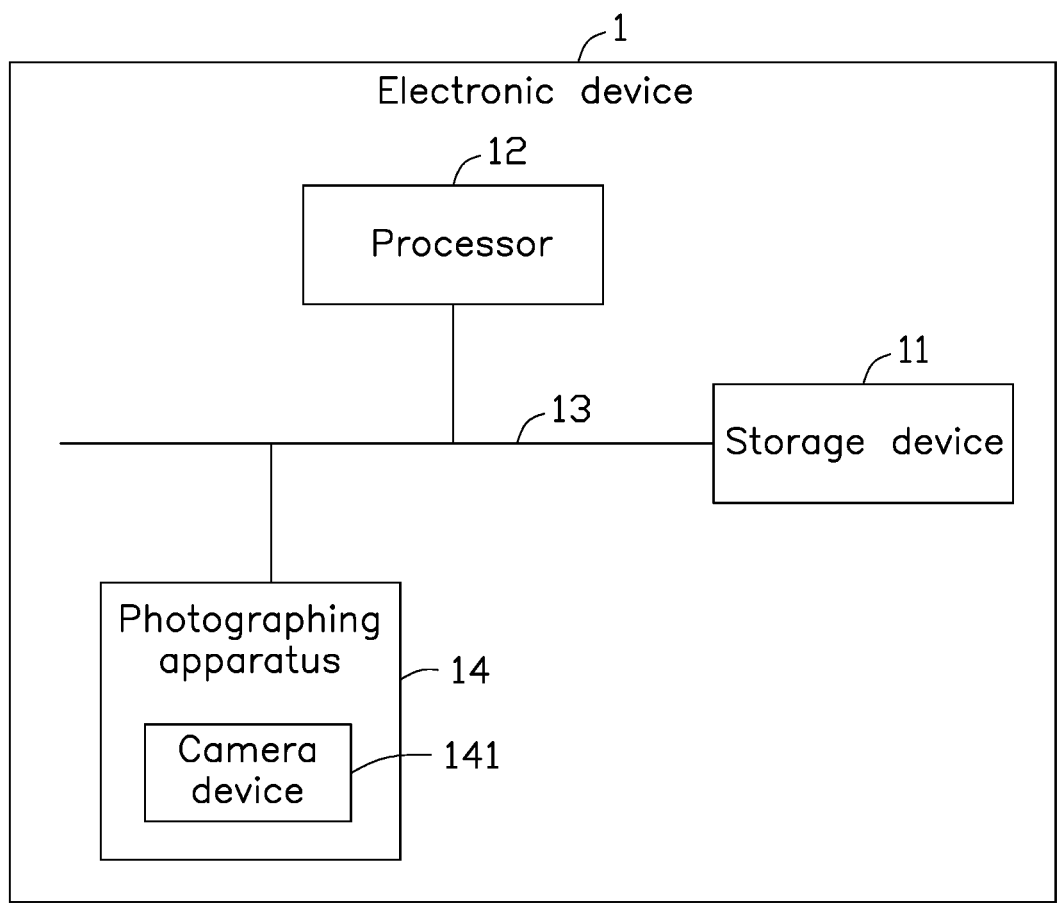
FIG. 1 is a schematic structural diagram of an electronic device provided by an embodiment of the present disclosure.

FIG. 1 is a schematic structural diagram of an electronic device provided by an embodiment of the present disclosure. As shown in FIG. 1, the electronic device includes, but is not limited to, a storage device 11, at least one processor 12 and a photographing apparatus 14. The storage device 11, the processor 12, and the photographing apparatus 14 may be connected through a communication bus 13 or may be electronical connected directly. The electronic device 1 is disposed on a vehicle, and the electronic device 1 may be a vehicle-mounted device. In some embodiments, the electronic device 1 may include a photographing apparatus 14 (for example, a camera) and a camera device 141 embedded in the photographing apparatus 14. The photographing apparatus 14 can be used to photograph a plurality of images or videos in front of the vehicle. FIG. 1 is only an exemplary description, in other embodiments, the electronic device 1 may not include the photographing apparatus 14, and the electronic device 1 is externally connected to the photographing apparatus. For example, the electronic device 1 is externally connected to a drive recorder, or one or more photographing apparatuses inside the vehicle. Then, the electronic device 1 can acquire images or videos are directly from the externally connected photographing apparatus. For example, the electronic device 1 may be in communicative connection with a drive recorder in the vehicle and acquire images or videos from the drive recorder.

It should be understood by those skilled in the art that the structure of the electronic device 1 illustrated in FIG. 1 does not constitute a limitation of an embodiment of the present invention, and that the electronic device 1 may also include more or less other hardware or software, or a different arrangement of components.

The processor 12 of the electronic device 1 can perform the lane line recognition method, which will be described later in detail, when executing a computer program including the lane line recognition program.

Figure 2:
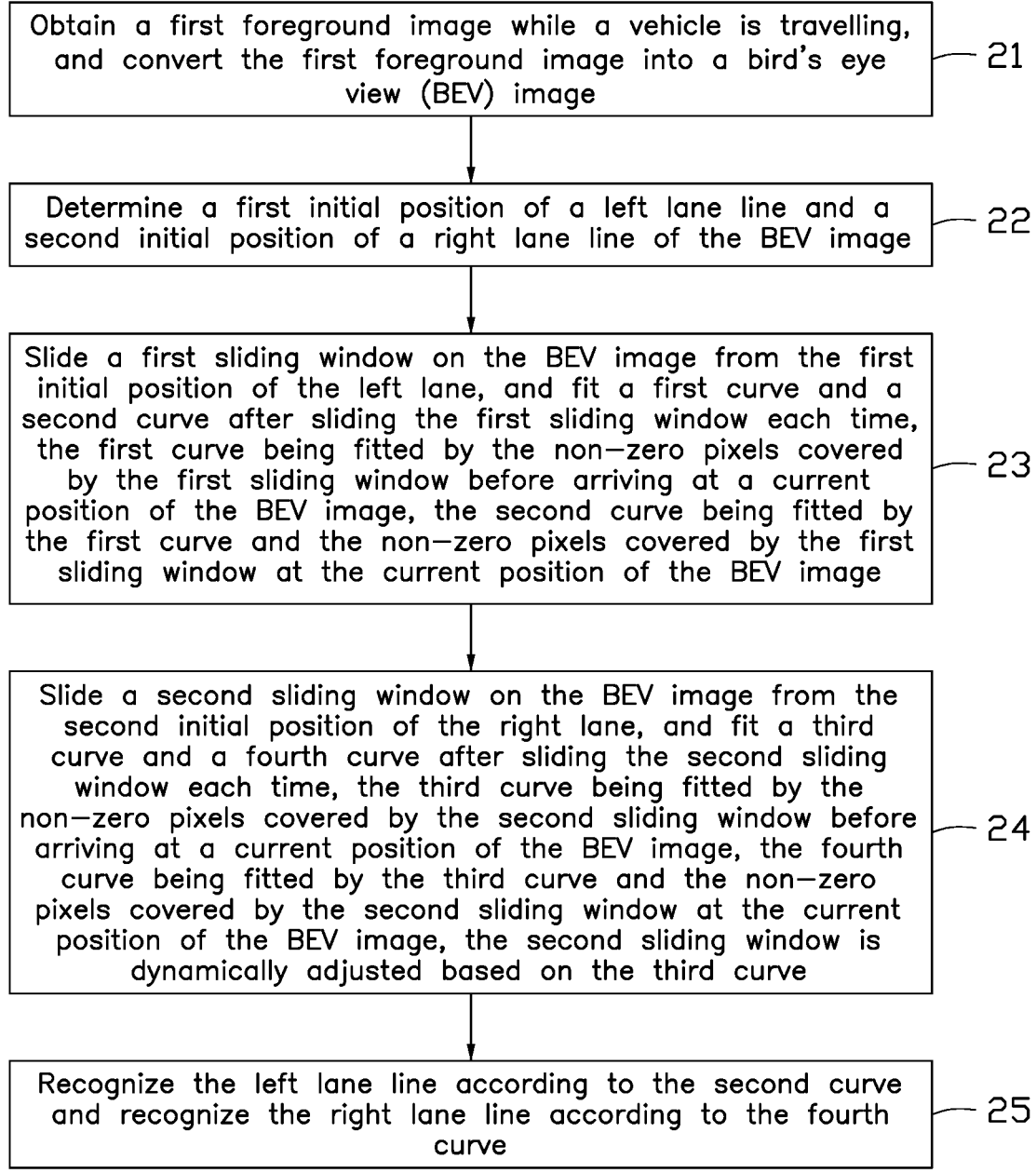
FIG. 2 is a flowchart of a lane line recognition method provided by an embodiment of the present disclosure.

FIG. 2 is a flowchart of a lane line recognition method provided by an embodiment of the present disclosure. The lane line recognition method can be performed in an electronic device (for example, the electronic device 1 of FIG. 1), which can improve the accuracy of the lane line recognition and ensure the safety of the vehicle driving. According to different requirements, an order of each block in the flowchart can be adjusted according to actual detection requirements, and some blocks can be omitted. In at least one embodiment, the lane line recognition method can include the following blocks.

In block 21, the electronic device obtains a first foreground image while a vehicle is travelling, and the electronic device converts the first foreground image into a bird's eye view (BEV) image.

In at least one embodiment, the first foreground image is an image of front scene of the vehicle. The front scene of the vehicle includes a lane line of a road which the vehicle is on. The first foreground image includes the lane lines. The lane lines include at least two traffic indicator lines.

In at least one embodiment, if the electronic device includes the photographing apparatus, the electronic device obtains the first foreground image by the photographing apparatus.

In at least one embodiment, if the electronic device does not include the photographing apparatus, the electronic device obtains the first foreground image by a photographing apparatus of the vehicle (for example, the drive recorder).

In at least one embodiment, the electronic device converts the first foreground image into a BEV image includes: obtains a first corrected image by performing distortion correction on the first foreground image and obtains the BEV image by performing perspective transformation on the first corrected image.

In at least one embodiment, the electronic device obtains a first corrected image by performing distortion correction on the first foreground image includes: acquires a first coordinate values of each non-zero pixel in the first foreground image in an image coordinate system which is established based on the first foreground image; acquires internal parameters of a camera device of the photographing apparatus; determines second coordinate values corresponding to the first coordinate values according to the internal parameters, wherein coordinates corresponding to the second coordinate values are an undistorted coordinates; calculates a distortion distance between the first coordinate values and a coordinate of a center point of the first foreground image; calculates an image complexity of the first foreground image according to a grayscale value of each pixel of the first foreground image, and determines a correction parameter of the first foreground image according to the image complexity; determines a smoothing processing coefficient corresponding to the distortion distance and the correction parameter according to a pre-set smoothing processing function; and obtains the first corrected image by performing smoothing correction on the first coordinate values based on the smoothing processing coefficient and the second coordinate values.

In at least one embodiment, the performing smoothing correction on the first coordinate values based on the smoothing processing coefficient and the second coordinate values includes: determining a first weight of the first coordinate values and a second weight of the second coordinate values based on the smoothing processing coefficient; calculating a first product of the first weight and the first coordinate values and calculating a second product of the second weight and the second coordinate values; performing smoothing correction on the first coordinate values based on a sum of the first product and the second product.

In at least one embodiment, the first foreground image will be distorted due to angle, rotation, and zoom of the photographing apparatus when shooting the first foreground image.

In at least one embodiment, the first foreground image usually is a distorted image, and distorting correction needs to be performed on the first foreground image. The electronic device establishes an image coordinate system of the first foreground image and obtains a first coordinate values corresponding to each non-zero pixel of the first foreground image, and the first coordinate values corresponding to the first foreground image having a certain distortion. The electronic device obtains the internal parameters of the camera device that takes the first foreground image. The internal parameters of the camera device being used to determine a degree of distortion of the first coordinate values. The electronic device obtains the coordinates corresponding to the first coordinate values without distortion as the second coordinate values according to the internal parameters and the obtained first coordinate values.

The electronic device calculates a grayscale value of each pixel of the first foreground image and calculates an image complexity of the first foreground image according to the grayscale value of each pixel. The electronic device calculates a sum of all the grayscale values to represent the image complexity by calculating the grayscale value of each pixel. The larger the sum of grayscale values of the first foreground image, the richer the content included in the representation image, and the higher the complexity of the image. Furthermore, the correction parameter of the first foreground image is determined according to the complexity. The complexity can be input into a pre-established depth learning model, and the correction parameter is determined based on the output of the depth learning model.

It may be understood that, due to shooting mechanism of the camera device, the closer to the edge of the image, the higher the distortion degree, the closer to the central region, the smaller the distortion degree. Therefore, the electronic device obtains a coordinate of a central point of the first foreground image and calculates the distortion distance between the first coordinate values and the obtained coordinate. The electronic device further calculates the smoothing processing coefficient based on the preset smoothing processing function and the distortion distance, wherein the smoothing processing coefficient is configured to correct the first foreground image.

At least one embodiment, a sum of the distortion distance and the correction parameter is calculated as the target value, and based on the preset smoothing function, a positive correlation between the target value and the smoothing processing coefficient is obtained, that is, the closer the region to the edges of the first foreground image, the higher the image complexity corresponding to the first foreground image, the larger the corresponding target value and the smoothing processing coefficient, and the stronger the correction processing is required. For the regions that are not the edges of the first foreground image, the corresponding target value and the smoothing processing coefficients are smaller, and weaker correction processing is required. Based on the positive correlation between the target value and the smoothing processing coefficient, using the smoothing processing coefficient and the second coordinate values to smoothly correct the first coordinate values for different regions of the first foreground image improves the calculation efficiency.

To improve a smoothness of the first corrected image, the first weight corresponding to the first coordinate values and the second weight corresponding to the second coordinate values are obtained, wherein the first weight and the smoothing processing coefficient are inversely related and the second weight and the smoothing processing coefficient are positively related, and the first coordinate values is smoothly corrected using the weighting method to guarantee the authenticity of the image.

In an embodiment of the present application, in order to remove irrelevant lane information in the first corrected image and obtain a binary map, the first corrected image is pre-set by image graying, gradient threshold and color threshold and saturation threshold preprocessing and so on. The electronic device obtains the BEV image by performing a perspective transformation on the binary map. The BEV image is a three-dimensional map based on the principle of perspective, which is drawn from a certain point on a high place looking down on the undulations of the ground by using the high viewpoint method, which is more realistic than the plan view.

In at least one embodiment, the performing a perspective transformation on the first corrected image includes: obtaining an inverse perspective transformation matrix by using a coordinate transformation formula on each target point of the first corrected image, wherein each target point is set by each non-zero pixel of the first corrected image; performing the perspective transformation on the first corrected image according to the inverse perspective transformation matrix.

In at least one embodiment, as the property that the lane lines on the road are approximately parallel, the electronic device can eliminate perspective effect of the first foreground image by performing perspective transformation on the foreground image. Each non-zero pixel of the first corrected image is set as a target point, and the target point is calculated by the coordinate transformation formula to obtain the inverse perspective transformation matrix. And a BEV image is obtained by performing the perspective transformation on the first corrected image according to the inverse perspective transformation matrix. The BEV image eliminates the interference of the road surroundings and the sky of the foreground image and retains only the lanes contained in the region of interest in the lane detection, for reducing the complex background calculation and facilitating the lane detection at a later stage.

In block 22, the electronic device determines a first initial position of a left lane line and a second initial position of a right lane line of the BEV image.

In at least one embodiment, the lane lines are extended wirelessly as the vehicle is moving. And the lane lines show as curves having a longitudinal trend, and the lane lines cannot have a large degree of curvature at a shorter distance. The lane lines are approximately the same as straight lines at a closer section of distance from the vehicle, which are represented in the BEV image as a section of lines close to perpendicular to the bottom of the image. Considering the above characteristics, a non-zero pixels distribution map can be created based on the lower half of the image of the BEV image, wherein the lower half of the BEV image can be an area closest to the vehicle.

In at least one embodiment, the non-zero pixels distribution map is established based on the non-zero pixel corresponding to the lower half of the BEV image, and a first peak value and a second peak value are obtained by accumulating a total number of non-zero pixels of each column of the non-zero pixels distribution map. Wherein, the first peak value can be a max value of the left area of the non-zero pixel distribution map, and the second peak can be a max value of the right area of the non-zero pixel distribution map. The first peak value being to the left of the second peak value, and a distance existing between the first peak value and the second peak value.

In order to improve the accuracy of identifying lane lines, the first peak value is set as the first initial position for searching the left lane line of the BEV image and the second peak is set as the second initial position for searching the right lane line of the BEV image. The direction for searching the lane line can be up and down along the direction of the lane line.

In block 23, the electronic device slides a first sliding window on the BEV image from the first initial position of the left lane, and fits a first curve and a second curve after sliding the first sliding window each time, the first curve being fitted by the non-zero pixels covered by the first sliding window before arriving at a current position of the BEV image, the second curve being fitted by the first curve and the non-zero pixels covered by the first sliding window at the current position of the BEV image. For example, at a first time t1, the electronic device slides the first sliding window at a position B1 on the BEV image; at a second time t2 after t1, the electronic device slides the first sliding window at a position B2 on the BEV image. Then, the first curve is fitted by the non-zero pixels covered by the first sliding window at the position B1, the second curve is fitted based on the first curve and the non-zero pixels covered by the first sliding window at the position B2 of the BEV image. The movement of the first sliding window is dynamically adjusted based on the first curve.

This embodiment uses a sliding window to search for lane lines, and the size of the sliding window is determined according to a predetermined size. A moving distance is set by a width of the sliding window in the longitudinal direction. For example, the size of the sliding window is equal to a width of 200 pixels occupied on the BEV image, and the moving distance is equal to the width of 200 pixels occupied on the BEV image when the sliding window moves each time.

An area covered by the sliding window can be determined based on a size of the sliding window, and in an embodiment of the present application, the non-zero pixels in the area covered by the first sliding window need to be determined and calculated. The non-zero pixels covered by the first sliding window is calculated by the non-zero pixels of the area covered by the first sliding window before a current position of the BEV image. Specifically, for the first sliding window corresponding to the first initial position of the left lane line, determining a horizontal coordinate of the first initial position of the left lane line of the first sliding window, and determining the non-zero pixels within the first sliding window based on a predetermined moving distance (i.e., a vertical coordinate) and the horizontal coordinates, and determining the coordinate corresponding to each non-zero pixel in the first sliding window at the initial position of the left lane line, using a least squares method to fit the non-zero pixel points of the first sliding window corresponding to the initial position of the left lane line into a first curve.

If the first sliding window is not the window corresponding to the first initial position of the left lane line, then the first curve is fitted based on the non-zero pixels covered by the first sliding window before the current position. Specifically, the non-zero pixels covered by the first sliding window before the current position means all the non-zero pixels covered by all positions that the first sliding window has slide through before the current position, and then, the first curve is fitted based on all the non-zero pixels covered by all positions that the first sliding window has slide through before the current position.

In at least one embodiment, the calculating the horizontal coordinate of the first sliding window at the current position is based on the first curve and the moving distance. For example, setting a horizontal coordinate corresponding to a center of the second sliding window as the horizontal coordinate of the second sliding window at the current position. In an embodiment, the movement of the first sliding window is dynamically adjusted according to the first curve, specifically, the first curve is obtained by fitting all non-zero pixels which covered by the first sliding window before the current position when the first sliding window is moving. The first curve is obtained by fitting all non-zero pixels which covered by the first sliding window when the first sliding window is at the first initial position. If the first sliding window is not at the first initial position, the first curve is obtained by fitting all non-zero pixels which covered by the first sliding window before the current position when the first sliding window is moving. Furthermore, a next position of the first sliding window is determined according to the first curve (specifically, refer to the detailed description of FIG. 3 below). Positions of the first sliding window during the movement can be dynamically adjusted according to the first curve. The second curve can be fitted based on the first curve and the non-zero pixels covered by the first sliding window at the current position.

For example, a formula of the first curve is $y=p(x)$, and a horizontal coordinate x corresponding to the center of the first sliding window is determined according to the moving distance y. The first sliding window corresponding to the current position is obtained according to the moving distance y and the horizontal coordinate x. The electronic device fits the second curve based on the non-zero pixels of the first sliding window corresponding to the first initial position of the left lane line and the non-zero pixels of the first sliding window at the current position and fits the second curve based on the first curve and the non-zero pixels covered by the first sliding window at the current position.

In this embodiment, the horizontal coordinate of the center of the first window determines the position of the first sliding window during the first sliding window moving, and the position of the first sliding window movement is determined by the first curve. The method described in this embodiment can also help the electronic device finding the lane lines accurately during the vehicle moving at curves of the lane line of the road, which avoiding the electronic device omit the curves that lead to inaccurate identification. To better determine the position of the lane line, the sliding position of the first sliding window needs to be dynamically adjusted according to the first curve. Specifically, determining the position where the first sliding window will be moved is based on the first curve, that is, the position of the center of the first window. The fitting of the first curve depends on the number of non-zero pixels in the area covered by the first sliding window. And using different positions corresponding to the area covered by the first sliding window can fit a dynamic third curve, and the dynamically fitted first curve is used to dynamically determine the next position of the first sliding window.

Figure 3:
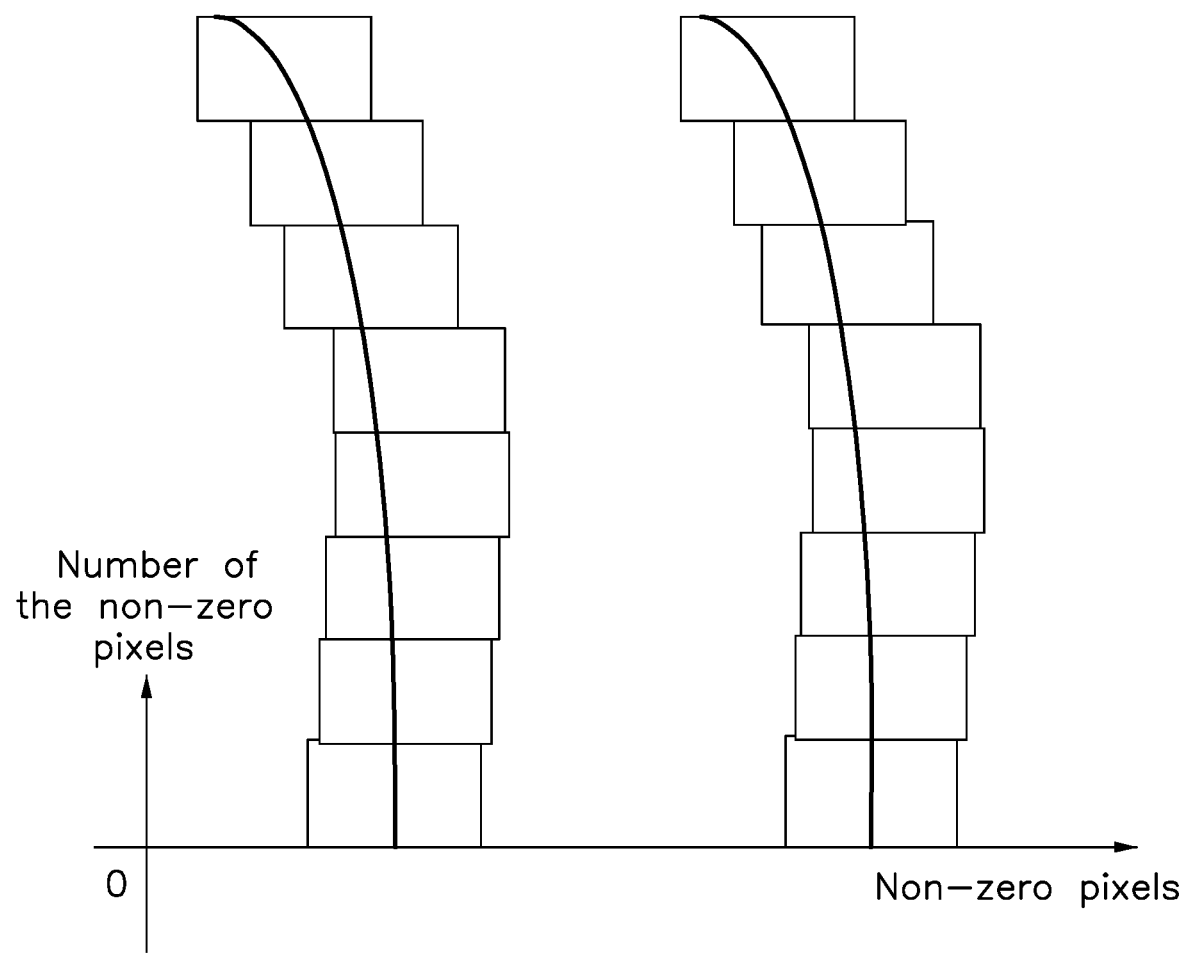
FIG. 3 is a schematic diagram of a second fitted curve provided by an embodiment of the present disclosure.

FIG. 3 is a schematic diagram of the second curve, and FIG. 3 shows the first sliding window at a first position A1, the first sliding window at a second position A2, and the first sliding window at a third position A3, respectively.

In at least one embodiment, if the current position of the first sliding window is the initial position of the left lane line (such as the first position A1 in FIG. 3), obtaining the curve F1 by using the least squares method to fit the non-zero pixels of the first sliding window corresponding to the initial position of the left lane line.

If the current position of the first sliding window is the second position A2, and the second position A2 is the next moving position corresponding to the initial position (such as the first position A1 in FIG. 3) of the left lane line. Obtaining a horizontal coordinate of a center of the first sliding window corresponding to the second position A2 according to a longitudinal coordinate of the first sliding window corresponding to the second position A2 (i.e., setting a longitudinal coordinate of the vertex coordinates corresponding to the first sliding window as the longitudinal coordinate of the first sliding window, and the longitudinal coordinate of the vertex coordinates is determined according to the preset moving distance). Further calculating the coordinates of each non-zero pixel of the first sliding window corresponding to the second position A2 and using the least squares method to fit the non-zero pixels in the first sliding window corresponding to the second position A2 of the first sliding window corresponding to the initial position of the left lane line into a curve F2.

If the current position of the first sliding window is the third position A3, and the third position A3 is the next moving position corresponding to the second position A2. Obtaining a horizontal coordinate of the first sliding window corresponding to the third position A3 according to a longitudinal coordinate of the first sliding window corresponding to the second position A3 and the curve F2. Further calculating the coordinates of each non-zero pixel of the first sliding window of the third position A3 and using the least squares method to fit the non-zero pixels in the first sliding window corresponding to the third position A3, the non-zero pixels in the first sliding window corresponding to the second position A2, and the non-zero pixels in the first sliding window corresponding to the first position A3 into curve F3. And obtaining the second curve Fn by analogy, wherein n represents the moving position of the first sliding window The method described in this embodiment can also help the electronic device finding the lane lines accurately during the vehicle moving at curves of the lane line of the road, which avoiding the electronic device omit the curves that lead to inaccurate identification.

In at least one embodiment, the fitting the second curve based on the first curve and the non-zero pixels covered by the first sliding window at the current position includes: obtaining the non-zero pixels corresponding to the first curve; calculating a first total number of the non-zero pixels covered by the first sliding window at the current position; if the first total number is greater than or equal to a predetermined number, obtaining the second curve by fitting the non-zero pixels corresponding to the first curve and the non-zero pixels covered by the first sliding window at the current position.

In at least one embodiment, the electronic device calculates the first total number of the non-zero pixels if the first sliding window at the current position. If the first total number is greater than or equal to the predetermined number, the electronic device obtains the second curve by fitting the non-zero pixels covered by the first sliding window at the current position and the non-zero pixels covered by the first sliding window before the current position. And the non-zero pixels covered by the first sliding window before the current position are the non-zero pixels corresponding to the fitted first curve. If the first total number is less than the predetermined number, there is no need to fit the non-zero pixels corresponding to the current position and indicating that the left lane line does not exist at the current position.

In block 24, the electronic device slides a second sliding window on the BEV image from the second initial position of the right lane, and fits a third curve and a fourth curve after sliding the second sliding window each time, the third curve being fitted by the non-zero pixels covered by the second sliding window before arriving at a current position of the BEV image, the fourth curve being fitted by the third curve and the non-zero pixels covered by the second sliding window at the current position of the BEV image. For example, at a third time t3, the electronic device slides the second sliding window at a position B3 on the BEV image; at a fourth time t4 after the third time t3, the electronic device slides the first sliding window at a position B4 on the BEV image. Then, the third curve is fitted by the non-zero pixels covered by the second sliding window at the position B3, the fourth curve is fitted based on the third curve and the non-zero pixels covered by the second sliding window at the position B4. The movement of the second sliding window is dynamically adjusted based on the third curve.

Searching for the right lane line is the same as searching for the left lane line, and fitting the left lane line is the same as fitting the right lane line.

The area covered by the sliding window can be determined based on the size of the sliding window, and in an embodiment of the present application, the non-zero pixels in the area covered by the second sliding window need to be determined and calculated. The non-zero pixels covered by the second sliding window is calculated by the non-zero pixels of the area covered by the second sliding window before a current position of the BEV image. Specifically, for the second sliding window corresponding to the second initial position of the right lane line, determining a horizontal coordinate of the second initial position of the right lane line of the second sliding window, and determining the non-zero pixels within the second sliding window based on the predetermined moving distance (i.e., a vertical coordinate) and the horizontal coordinates, and determining the coordinates corresponding to each non-zero pixel within the first sliding window corresponding to the initial position of the left lane line, using least-squares multiplication method to fit the non-zero pixel points within said first sliding window to a first curve corresponding to the first sliding window corresponding to the initial position of the left lane line.

If the second sliding window is not the window corresponding to the second initial position of the right lane line, then the third curve is fitted based on the non-zero pixels covered by the second sliding window before the current position. Specifically, the non-zero pixels covered by the second sliding window before the current position means all the non-zero pixels covered by all positions that the second sliding window has slide through before the current position, and then, the third curve is fitted based on all the non-zero pixels covered by all positions that the second sliding window has slide through before the current position.

In at least one embodiment, the calculating the horizontal coordinate of the second sliding window at the current position is based on the third curve and the moving distance. For example, setting a horizontal coordinate corresponding to a center of the second sliding window as the horizontal coordinate of the second sliding window at the current position. In an embodiment, the movement of the second sliding window is dynamically adjusted according to the third curve, specifically, the third curve is obtained by fitting all non-zero pixels which covered by the second sliding window before the current position when the second sliding window is moving. The third curve is obtained by fitting all non-zero pixels which covered by the second sliding window when the first sliding window is at the second initial position. If the first sliding window is not at the second initial position, the third curve is obtained by fitting all non-zero pixels which covered by the second sliding window before the second current position when the second sliding window is moving. Furthermore, a next position of the second sliding window is determined according to the third curve. Positions of the second sliding window during the movement can be dynamically adjusted according to the third curve. The fourth curve can be fitted based on the third curve and the non-zero pixels covered by the second sliding window at the second current position.

For example, a formula of the third curve is y=p(x), and a horizontal coordinate x corresponding to the center of the second sliding window is determined according to the moving distance y. The second sliding window corresponding to the current position is obtained according to the moving distance y and the horizontal coordinate x. The electronic device fits the second curve based on the non-zero pixels of the second sliding window corresponding to the second initial position of the right lane line and the non-zero pixels of the second sliding window at the current position and fits the fourth curve based on the non-zero pixels covered by the second sliding window at the current position and the third curve.

In this embodiment, the horizontal coordinate of the center of the second window determines the position of the second sliding window during the second sliding window moving, and the position of the second sliding window movement is determined by the third curve. The method described in this embodiment can also help the electronic device finding the lane lines accurately during the vehicle moving at curves of the lane line of the road, which avoiding the electronic device omit the curves that lead to inaccurate identification. To better determine the position of the lane line, the sliding position of the second sliding window needs to be dynamically adjusted according to the third curve. Specifically, determining the position where the second sliding window will be moved is based on the third curve, that is, the position of the center of the second window. The fitting of the third curve depends on the number of non-zero pixels in the area covered by the second sliding window. And using different positions corresponding to the area covered by the second sliding window can fit a dynamic third curve, and the dynamically fitted third curve is used to dynamically determine the next position of the second sliding window.

In at least one embodiment, the fitting the fourth curve based on the third curve and the non-zero pixels covered by the second sliding window at the current position includes: obtaining the non-zero pixels corresponding to the third curve; calculating a second total number of the non-zero pixels covered by the second sliding window at the current position; if the second total number is greater than or equal to a predetermined number, obtaining the fourth curve by fitting the non-zero pixels corresponding to the third curve and the non-zero pixels covered by the second sliding window at the current position.

In at least one embodiment, the electronic device calculates the second total number of the non-zero pixels if the second sliding window at the current position. If the second total number is greater than or equal to the predetermined number, the electronic device obtains the fourth curve by fitting the non-zero pixels covered by the second sliding window at the current position and the non-zero pixels covered by the second sliding window before the current position. And the non-zero pixels covered by the second sliding window before the current position are the non-zero pixels corresponding to the fitted fourth curve. If the second total number is less than the predetermined number, there is no need to fit the non-zero pixels corresponding to the current position and indicating that the right lane line does not exist at the current position.

In block 25, the electronic device recognizes the left lane line according to the second curve and recognize the right lane line according to the fourth curve.

In at least one embodiment, the electronic device searches for the left lane line by using the first sliding window. The electronic device fits the first curve based on the non-zero pixels covered by the first sliding window before the current position and fits the second curve based on the first curve and the non-zero pixels covered by the first sliding window at the current position, and obtains the left lane line based on the second curve. Where the center of the first sliding window of the first sliding window corresponding to the current position is located can be effectively detected, and the accuracy of searching the left lane line can be improved.

In at least one embodiment, the electronic device searches for the right lane line by using the second sliding window. The electronic device fits the third curve based on the non-zero pixels covered by the second sliding window before the current position and fits the fourth curve based on the third curve and the non-zero pixels covered by the second sliding window at the current position, and obtains the right lane line based on the fourth curve. Where the center of the second sliding window of the second sliding window corresponding to the current position is located can be effectively detected, and the accuracy of searching the right lane line can be improved.

In one embodiment, the lane recognition method further includes: the electronic device obtains a second foreground image taken by the photographing apparatus while the vehicle is moving, wherein, the second foreground image being taken at a moment next to the first foreground image; obtains a second corrected image by performing distortion correction on the second foreground image; and obtains a first boundary by extending the left lane line in a first direction according to a predetermined extension distance; and obtains a second boundary by extending the right lane line in a second direction according to the predetermined extension distance; and determines the area where the lane lines are located in the second correction image by performing area division on the second correction image according to the first boundary and the second boundary.

Figure 4:
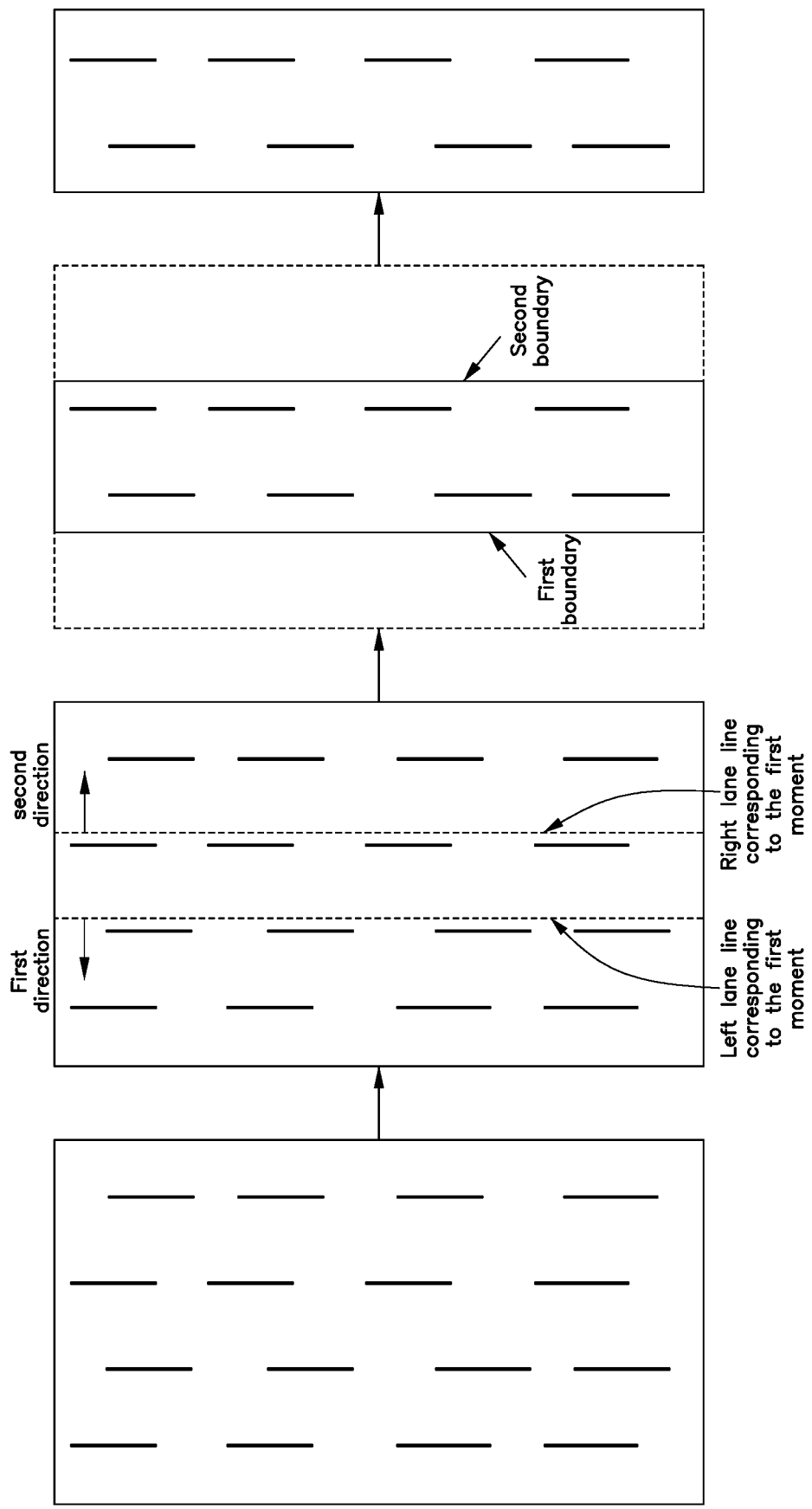
FIG. 4 is a schematic diagram of an area where the lane lines are located on a road according to a second moment provided by an embodiment of the present disclosure.

FIG. 4 is a schematic diagram of the area where the lane line is located according to the second moment. The method described in this application embodiment considers the continuity of the lane line and does not require a complete window search for each frame of the foreground image. After processing of a frame at the first moment, the region where the lane line is located at the second moment can be predicted based on the left lane line and the right lane line obtained at the first moment. As shown in FIG. 4, the first boundary is determined based on the left lane line obtained at the first moment and the second boundary is determined based on the right lane line obtained at the second moment, and the area between the first boundary and the second boundary is obtained by using the property of constant distance between the left lane line and the right lane line. Mask-processing other areas of the second foreground image obtained by the photographing apparatus, and setting the region between the obtained first boundary and the second boundary as the lane of the road at the second moment, which improves the efficiency of detecting the lane lines.

The lane line recognition method includes: fitting the first curve based on the non-zero pixels covered by the first sliding window before the current position; obtaining the position of a center of the first window of the first sliding window corresponding to the current position, and fitting the third curve based on the non-zero pixels covered by the second sliding window at the current position, and obtaining the position of a center of the second window of the second sliding window corresponding to the current position. The accuracy of detecting the lane lines is improved. Based on the characteristics of the lane lines, the area where the lane lines of the second moment are located is obtained based on the lane lines obtained at the first time, which improves the efficiency of detecting the lane lines.

Referring further to FIG. 1, in this embodiment, the storage device 11 may be an internal memory of the electronic device 1, i.e., the storage device 11 is embedded in the electronic device 1. In other embodiments, the storage device 11 may also be an external memory of the electronic device 1, i.e., the storage device 11 is external connected to the electronic device 1.

In some embodiments, the storage device 11 is used to store program code and various data and to enable high-speed, automatic access to the program or data during operation of the electronic device 1.

The storage device 11 may include random access memory and may also include non-volatile memory such as a hard disk, memory, plug-in hard disk, Smart Media Card (SMC), Secure Digital (SD) card, Flash Card, at least one disk memory device, flash memory device, or other volatile solid state memory device.

In one embodiment, the at least one processor 12 may be a Central Processing Unit (CPU), and may also be other general purpose processors, Digital Signal Processor (DSP), Application Specific Integrated Circuit (ASIC), or other volatile solid state memory devices, Integrated Circuit (ASIC), Field-Programmable Gate Array (FPGA) or other programmable logic device, discrete gate or transistor logic device, discrete hardware component, etc. The general-purpose processor may be a microprocessor or the processor may also be any other conventional processor, etc.

The program code and various data in the storage device 11 may be stored in a computer readable storage medium if implemented as a software functional unit and sold or used as a separate product. Based on such an understanding, the present application realizes all or part of the processes in the method of the above-described embodiments, such as the lane line recognition method, which may also be accomplished by means of a computer program to instruct the relevant hardware, the computer program may be stored in a computer readable storage medium, and the computer program, when executed by a processor, may implement the blocks of each of the above-described method embodiments. Wherein the computer program includes computer program code, the computer program code may be in the form of source code, in the form of object code, in the form of an executable file or in some intermediate form, etc. The computer readable medium may include: any entity or device capable of carrying said computer program code, a recording medium, a USB stick, a removable hard disk, a diskette, an optical disk, a computer memory, a read-only memory (ROM, Read-Only Memory), etc.

It is understood that the division of modules described above is a logical functional division, and there can be another division in actual implementation. In addition, each functional module in each embodiment of the present application may be integrated in the same processing unit, or each module may physically exist separately, or two or more modules may be integrated in the same unit. The above integrated modules can be implemented either in the form of hardware or in the form of hardware plus software functional modules. The above description is only embodiments of the present disclosure and is not intended to limit the present disclosure, and various modifications and changes can be made to the present disclosure. Any modifications, equivalent substitutions, improvements, etc. made within the spirit and scope of the present disclosure are intended to be included within the scope of the present disclosure.

What is claimed is:

1. A lane line recognition method using an electronic device, the method comprising:
    obtaining a first foreground image while a vehicle is travelling, and converting the first foreground image into a bird's eye view (BEV) image;
    determining a first initial position of a left lane line and a second initial position of a right lane line of the BEV image;
    sliding a first sliding window on the BEV image from the first initial position, and fitting a first curve and a second curve after sliding the first sliding window each time, the first curve being fitted by a plurality of non-zero pixels covered by the first sliding window before arriving at a current position of the BEV image, the second curve being fitted by the first curve and a plurality of non-zero pixels covered by the first sliding window at the current position of the BEV image;

sliding a second sliding window on the BEV image from the second initial position, and fitting a third curve and a fourth curve after sliding the second sliding window each time, the third curve being fitted by a plurality of non-zero pixels covered by the second sliding window before arriving at the current position of the BEV image, the fourth curve being fitted by the third curve and a plurality of non-zero pixels covered by the second sliding window at the current position of the BEV image; and recognizing the left lane line according to the second curve and the right lane line according to the fourth curve;

obtaining a second foreground image taken by the photographing apparatus while the vehicle is moving, the second foreground image being taken at a next moment of the first foreground image;

obtaining a second corrected image by performing a distortion correction on the second foreground image;

obtaining a first boundary by extending the left lane line in a first direction according to a predetermined extension distance;

obtaining a second boundary by extending the right lane line in a second direction according to the predetermined extension distance; and determining the area where the lane lines are located in the second correction image by performing an area division on the second correction image according to the first boundary and the second boundary.

2. The lane line recognition method according to claim 1, wherein converting the first foreground image into the BEV image comprises:

obtaining a first corrected image by performing a distortion correction on the first foreground image; and obtaining the BEV image by performing a perspective transformation on the first corrected image.

3. The lane line recognition method according to claim 2, wherein obtaining the first corrected image by performing the distortion correction on the first foreground image comprises:

acquiring first coordinate values of each non-zero pixel in the first foreground image in an image coordinate system, the image coordinate system being established based on the first foreground image;

acquiring a plurality of internal parameters of a camera device of a photographing apparatus of the electronic device;

determining second coordinate values corresponding to the first coordinate values according to the plurality of internal parameters, coordinates corresponding to the second coordinate values being undistorted coordinates;

calculating a distortion distance between the first coordinate values and coordinate values of a center point of the first foreground image;

calculating an image complexity of the first foreground image according to a grayscale value of each pixel of the first foreground image;

calculating a correction parameter of the first foreground image according to the image complexity;

determining a smoothing processing coefficient corresponding to the distortion distance and the correction parameter according to a preset smoothing processing function; and obtaining the first corrected image by performing a smoothing correction on the first coordinate values based on the smoothing processing coefficient and the second coordinate values.

4. The lane line recognition method according to claim 3, wherein performing smoothing correction on the first coordinate values based on the smoothing processing coefficient and the second coordinate values comprises:

determining a first weight of the first coordinate values and a second weight of the second coordinate values based on the smoothing processing coefficient;

calculating a first product of the first weight and the first coordinate values, and calculating a second product of the second weight and the second coordinate values; and performing the smoothing correction on the first coordinate values based on a sum of the first product and the second product.

5. The lane line recognition method according to claim 2, wherein performing the perspective transformation on the first corrected image comprises:

obtaining an inverse perspective transformation matrix by using a coordinate transformation formula on each target point of the first corrected image, each target point being set by each non-zero pixel of the first corrected image; and performing the perspective transformation on the first corrected image according to the inverse perspective transformation matrix.

6. The lane line recognition method according to claim 1, wherein fitting the second curve according to the first curve and the plurality of non-zero pixels covered by the first sliding window at the current position of the BEV image comprises:

obtaining the non-zero pixels corresponding to the first curve;

calculating a first total number of the non-zero pixels covered by the first sliding window at the current position; and obtaining the second curve by fitting the non-zero pixels corresponding to the first curve and the non-zero pixels covered by the first sliding window at the current position in response that the first total number is greater than or equal to a predetermined number.

7. The lane line recognition method according to claim 1, wherein fitting the fourth curve based on the third curve and the non-zero pixels covered by the second sliding window at the current position includes:

obtaining the non-zero pixels corresponding to the third curve;

calculating a second total number of the non-zero pixels covered by the second sliding window at the current position, in response that the second total number is greater than or equal to the predetermined number; and obtaining the fourth curve by fitting the non-zero pixels corresponding to the third curve and the non-zero pixels covered by the second sliding window at the current position.

8. An electronic device comprising:

a storage device;

at least one processor; and the storage device storing one or more computer instructions, which when executed by the at least one processor, cause the at least one processor to:

obtain a first foreground image while a vehicle is travelling, and converting the first foreground image into a bird's eye view (BEV) image;

determine a first initial position of a left lane line and a second initial position of a right lane line of the BEV image;

slide a first sliding window on the BEV image from the first initial position, and fit a first curve and a second curve after sliding the first sliding window each time, the first curve being fitted by a plurality of non-zero pixels covered by the first sliding window before arriving at a current position of the BEV image, the second curve being fitted by the first curve and a plurality of non-zero pixels covered by the first sliding window at the current position of the BEV image;

slide a second sliding window on the BEV image from the second initial position, and fit a third curve and a fourth curve after sliding the second sliding window each time, the third curve being fitted by a plurality of non-zero pixels covered by the second sliding window before arriving at the current position of the BEV image, the fourth curve being fitted by the third curve and a plurality of non-zero pixels covered by the second sliding window at the current position of the BEV image;

recognize the left lane line according to the second curve and the right lane line according to the fourth curve;

obtain a second foreground image taken by the photographing apparatus while the vehicle is moving, the second foreground image being taken at a next moment of the first foreground image;

obtain a second corrected image by performing a distortion correction on the second foreground image;

obtain a first boundary by extending the left lane line in a first direction according to a predetermined extension distance;

obtain a second boundary by extending the right lane line in a second direction according to the predetermined extension distance; and determine the area where the lane lines are located in the second correction image by performing an area division on the second correction image according to the first boundary and the second boundary.

9. The electronic device according to claim 8, wherein the at least one processor converts the first foreground image into the BEV image by:

obtaining a first corrected image by performing a distortion correction on the first foreground image; and obtaining the BEV image by performing transformation on the first corrected image.

10. The electronic device according to claim 9, wherein the at least one processor obtains the first corrected image by performing the distortion correction on the first foreground image by:

acquiring a first coordinate values of each non-zero pixel in the first foreground image in an image coordinate system, the image coordinate system being established based on the first foreground image;

acquiring a plurality of internal parameters of a camera device of a photographing apparatus of the electronic device;

determining second coordinate values corresponding to the first coordinate values according to the plurality of internal parameters, coordinates corresponding to the second coordinate values being undistorted coordinates;

calculating a distortion distance between the first coordinate values and coordinate values of a center point of the first foreground image;

calculating an image complexity of the first foreground image according to a grayscale value of each pixel of the first foreground image;

calculating a correction parameter of the first foreground image according to the image complexity;

determining a smoothing processing coefficient corresponding to the distortion distance and the correction parameter according to a pre-set smoothing processing function; and obtaining the first corrected image by performing a smoothing correction on the first coordinate values based on the smoothing processing coefficient and the second coordinate values.

11. The electronic device according to claim 10, wherein the at least one processor performs smoothing correction on the first coordinate values based on the smoothing processing coefficient and the second coordinate values by:

determining a first weight of the first coordinate values and a second weight of the second coordinate values based on the smoothing processing coefficient;

calculating a first product of the first weight and the first coordinate values and a second product of the second weight and the second coordinate values; and performing the smoothing correction on the first coordinate values based on a sum of the first product and the second product.

12. The electronic device according to claim 9, wherein the at least one processor performs the perspective transformation on the first corrected image by:

obtaining an inverse perspective transformation matrix by using a coordinate transformation formula on each target point of the first corrected image, each target point being set by each non-zero pixel of the first corrected image; and performing the perspective transformation on the first corrected image according to the inverse perspective transformation matrix.

13. The electronic device according to claim 8, wherein the at least one processor fits the second curve according to the first curve and the plurality of non-zero pixels covered by the first sliding window at the current position of the BEV image by:

obtaining the non-zero pixels corresponding to the first curve;

calculating a first total number of the non-zero pixels covered by the first sliding window at the current position; and obtaining the second curve by fitting the non-zero pixels corresponding to the first curve and the non-zero pixels covered by the first sliding window at the current position in response that the first total number is greater than or equal to a predetermined number.

14. The electronic device according to claim 8, wherein the at least one processor fits the fourth curve based on the third curve and the non-zero pixels covered by the second sliding window at the current position by:

obtaining the non-zero pixels corresponding to the third curve;

calculating a second total number of the non-zero pixels covered by the second sliding window at the current position, in response that the second total number is greater than or equal to the predetermined number; and obtaining the fourth curve by fitting the non-zero pixels corresponding to the third curve and the non-zero pixels covered by the second sliding window at the current position.

15. A non-transitory storage medium having instructions stored thereon, when the instructions are executed by a processor of an electronic device, cause the processor to perform a lane line recognition method, the method comprising:

obtaining a first foreground image while a vehicle is travelling, and converting the first foreground image into a bird's eye view (BEV) image;

determining a first initial position of a left lane line and a second initial position of a right lane line of the BEV image;

sliding a first sliding window on the BEV image from the first initial position, and fitting a first curve and a second curve after sliding the first sliding window each time, the first curve being fitted by a plurality of non-zero pixels covered by the first sliding window before arriving at a current position of the BEV image, the second curve being fitted by the first curve and a plurality of non-zero pixels covered by the first sliding window at the current position of the BEV image;

sliding a second sliding window on the BEV image from the second initial position, and fitting a third curve and a fourth curve after sliding the second sliding window each time, the third curve being fitted by a plurality of non-zero pixels covered by the second sliding window before arriving at the current position of the BEV image, the fourth curve being fitted by the third curve and a plurality of non-zero pixels covered by the second sliding window at the current position of the BEV image; and recognizing the left lane line according to the second curve and the right lane line according to the fourth curve;

obtaining a second foreground image taken by the photographing apparatus while the vehicle is moving, the second foreground image being taken at a next moment of the first foreground image;

obtaining a second corrected image by performing a distortion correction on the second foreground image;

obtaining a first boundary by extending the left lane line in a first direction according to a predetermined extension distance;

obtaining a second boundary by extending the right lane line in a second direction according to the predetermined extension distance; and determining the area where the lane lines are located in the second correction image by performing an area division on the second correction image according to the first boundary and the second boundary.

16. The non-transitory storage medium according to claim 15, wherein fitting the second curve according to the first curve and the plurality of non-zero pixels covered by the first sliding window at the current position of the BEV image comprises:

obtaining the non-zero pixels corresponding to the first curve;

calculating a first total number of the non-zero pixels covered by the first sliding window at the current position; and obtaining the second curve by fitting the non-zero pixels corresponding to the first curve and the non-zero pixels covered by the first sliding window at the current position in response that the first total number is greater than or equal to a predetermined number.

17. The non-transitory storage medium according to claim 15, wherein fitting the fourth curve based on the third curve and the non-zero pixels covered by the second sliding window at the current position includes:

obtaining the non-zero pixels corresponding to the third curve;

calculating a second total number of the non-zero pixels covered by the second sliding window at the current position, in response that the second total number is greater than or equal to the predetermined number; and obtaining the fourth curve by fitting the non-zero pixels corresponding to the third curve and the non-zero pixels covered by the second sliding window at the current position.

\* \* \* \* \*